(12) United States Patent
Seo

(10) Patent No.: US 9,270,208 B2
(45) Date of Patent: Feb. 23, 2016

(54) CONTROL DEVICE AND CONTROL METHOD FOR VEHICULAR POWER SYSTEM

(71) Applicant: Yusuke Seo, Kasugai (JP)

(72) Inventor: Yusuke Seo, Kasugai (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 141 days.

(21) Appl. No.: 14/284,943

(22) Filed: May 22, 2014

(65) Prior Publication Data

US 2014/0354210 A1 Dec. 4, 2014

(30) Foreign Application Priority Data

May 30, 2013 (JP) ................................. 2013-113764

(51) Int. Cl.
*H02P 23/00* (2006.01)
*H02P 23/03* (2006.01)
*H02P 1/30* (2006.01)
*H02P 29/02* (2006.01)

(52) U.S. Cl.
CPC ........... *H02P 1/30* (2013.01); *H02P 23/03* (2013.01); *H02P 29/021* (2013.01); *Y02T 10/7258* (2013.01)

(58) Field of Classification Search
CPC ......... H02P 1/30; H02P 23/03; H02P 29/021; H02P 21/0035; H02P 21/0039; Y02T 10/7258
USPC .................................. 318/807, 798, 801, 434
See application file for complete search history.

(56) References Cited

U.S. PATENT DOCUMENTS

| | | | | |
|---|---|---|---|---|
| 5,301,768 A * | 4/1994 | Ishikawa | ............ | B60K 23/0808 180/197 |
| 5,594,670 A * | 1/1997 | Yamamoto | ............ | G01R 31/343 318/767 |
| 5,627,750 A * | 5/1997 | Kono | ............ | F16D 48/066 477/176 |
| 5,654,887 A * | 8/1997 | Asa | ............ | B60L 3/10 180/65.285 |
| 5,703,459 A * | 12/1997 | Yasohara | ............ | H02P 29/027 318/758 |
| 5,747,833 A * | 5/1998 | Fujisaki | ............ | H02P 23/08 318/802 |
| 5,749,061 A * | 5/1998 | Kono | ............ | F16D 48/066 192/3.3 |
| 6,231,134 B1 * | 5/2001 | Fukasawa | ............ | B60L 7/26 303/152 |
| 6,315,369 B1 * | 11/2001 | Hirose | ............ | B60T 8/404 303/10 |
| 6,469,469 B1 * | 10/2002 | Chambers | ............ | H02P 23/08 318/801 |
| 6,542,805 B1 * | 4/2003 | Mergenthaler | ............ | B60T 8/1755 340/438 |
| 6,649,469 B1 * | 11/2003 | Wilson | ............ | H01L 21/31116 257/E21.019 |
| 6,801,862 B2 * | 10/2004 | Grob | ............ | B60T 8/58 303/112 |
| 6,804,130 B2 * | 10/2004 | Morimoto | ............ | H02P 21/0035 363/132 |
| 7,545,116 B2 * | 6/2009 | Nagata | ............ | H02P 21/085 318/727 |
| 7,641,031 B2 * | 1/2010 | Nakamura | ............ | F16H 61/143 192/3.31 |
| 7,739,005 B1 * | 6/2010 | Tang | ............ | B60L 3/10 701/22 |

(Continued)

FOREIGN PATENT DOCUMENTS

JP 2000-333892 A 12/2000
JP 2004248499 A 9/2004

(Continued)

*Primary Examiner* — Rita Leykin
(74) *Attorney, Agent, or Firm* — Sughrue Mion, PLLC

(57) ABSTRACT

A control device for a vehicular power system including an induction motor includes an electronic control unit configured to detect a locked state of the induction motor, calculate a lock-release slip frequency that causes an electric frequency to be outside a lock range, and control the induction motor so that a slip frequency of the induction motor becomes equal to the lock-release slip frequency when the locked state is detected.

4 Claims, 5 Drawing Sheets

(56) References Cited

U.S. PATENT DOCUMENTS

| | | | | |
|---|---|---|---|---|
| 7,742,852 B1 * | 6/2010 | Tang | .................... | B60L 3/10 701/22 |
| 7,902,790 B2 * | 3/2011 | Arakawa | ................. | H02P 23/08 318/400.02 |
| 8,076,896 B2 * | 12/2011 | Yamamoto | ........ | H02M 7/53875 318/400.07 |
| 8,174,217 B2 * | 5/2012 | Zhang | ................... | H02P 21/14 318/400.01 |
| 8,523,296 B2 * | 9/2013 | Kikuchi | .............. | B60L 15/2009 180/65.1 |
| 2010/0121515 A1 | 5/2010 | Izumi | | |

FOREIGN PATENT DOCUMENTS

| | | |
|---|---|---|
| JP | 2007-329982 A | 12/2007 |
| JP | 2010-115059 A | 5/2010 |

* cited by examiner

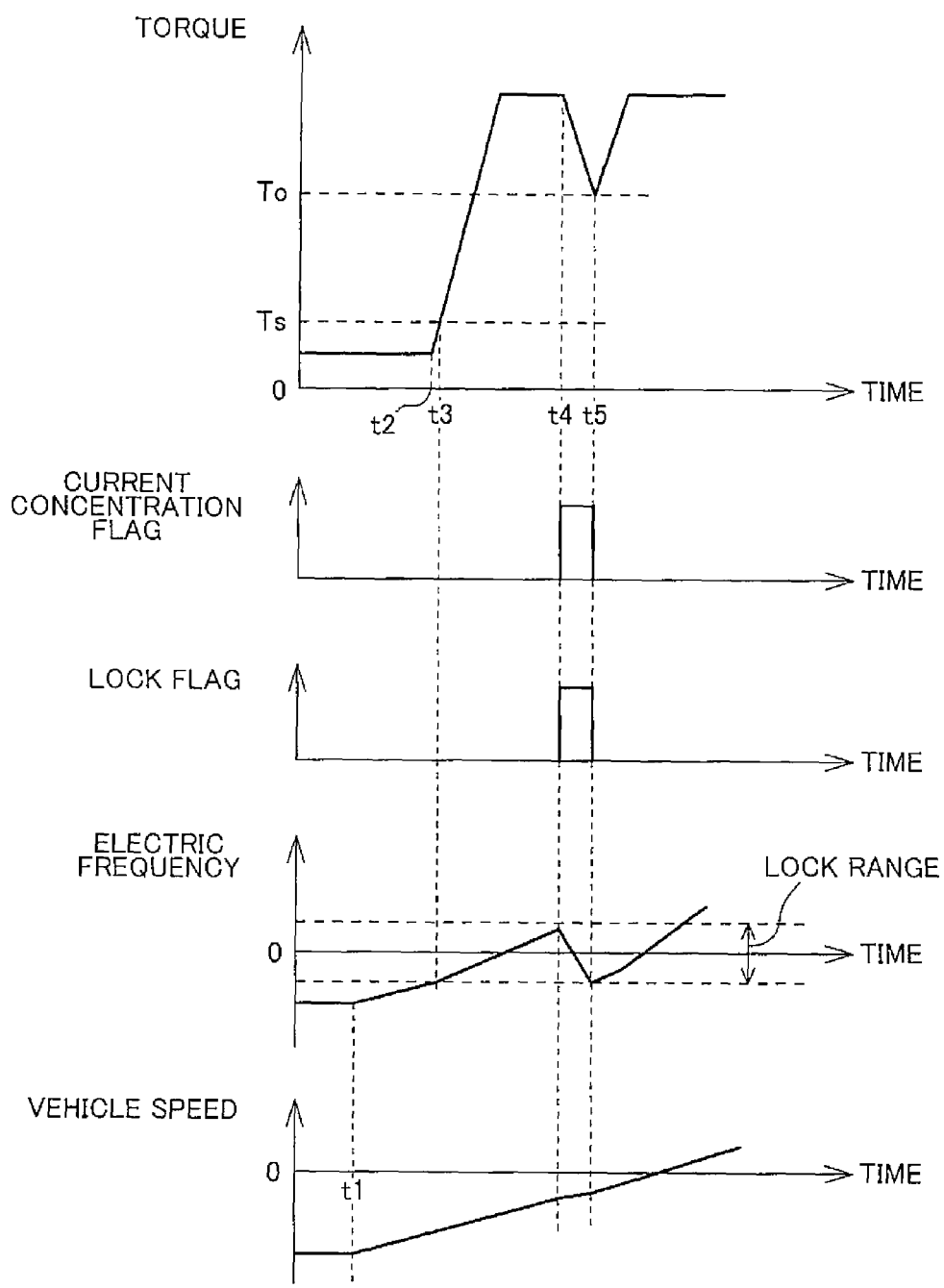

CONTROL DEVICE AND CONTROL METHOD FOR VEHICULAR POWER SYSTEM

INCORPORATION BY REFERENCE

The disclosure of Japanese Patent Application No. 2013-113764 filed on May 30, 2013 including the specification, drawings and abstract is incorporated herein by reference in its entirety.

BACKGROUND OF THE INVENTION

1. Field of the Invention

The invention relates to a control device and a control method for a vehicular power system including an induction motor as a prime mover for driving a vehicle.

2. Description of Related Art

A vehicular power system including an electric motor as a prime mover for driving a vehicle is known. For example, a power system for a hybrid vehicle, which includes an electric motor and an internal combustion engine as prime movers, and a power system for an electric vehicle, which includes only an electric motor, are known.

If electric power for driving the vehicle is supplied to the electric motor while the vehicle is hardly moving, the motor may be brought into a state in which electric current keeps flowing into one phase of the motor. The state in which the current is concentrated in one phase will be denoted as "locked state". If the motor is brought into the locked state, heat may be intensively generated in a circuit that supplies current to the phase in which the current is concentrated, and the circuit may be overheated. Technologies for preventing the overheating are described in patent documents as indicated below, for example.

According to a technology as described in Japanese Patent Application Publication No. 2007-329982 (JP 2007-329982 A), when the vehicle is kept stopped on an uphill road for a long time, through control of the accelerator pedal by the driver, the driving force of the motor is reduced, so as to prevent overheating of the motor that is in the locked state (see paragraph [0002]). It is also proposed to change the degree of reduction of the driving force, according to the gradient of the road surface, required driving force, operating state of the motor, and so forth (see paragraph [0005]).

According to a technology as described in Japanese Patent Application Publication No. 2010-115059 (JP 2010-115059 A), the motor is controlled so that torque becomes equal to or smaller than the maximum torque with which heat generated in the circuit when the motor is in the locked state is within a permissible range (see paragraph [0026]).

SUMMARY OF THE INVENTION

When the motor is brought into the locked state, overheating of the circuit is prevented by reducing the driving force of the motor, torque or current, according to the technologies disclosed in JP 2007-329982 A and JP 2010-115059 A. Namely, in the locked state, the value of current supplied to the motor is reduced so as to reduce heat generated in the circuit, and prevent overheating. In an induction motor, there is a difference (slip) between the rotational speed of a rotor of the motor, and the rotational speed of a rotating magnetic field formed by the motor, and the locked state may be eliminated (i.e., the motor may be released from the locked state) by controlling the slip.

The invention provides a control device and a control method for a vehicular power system including an induction motor, which protect a circuit that supplies electric power to the motor, by a method other than control of heat generation due to concentration of phase current.

According to a first aspect of the invention, a control device for a vehicular power system including an induction motor includes an electronic control unit configured to: (a) detect a locked state of the induction motor, (b) calculate a lock-release slip frequency that causes an electric frequency to be outside a lock range, and (c) control the induction motor so that a slip frequency of the induction motor becomes equal to the lock-release slip frequency when the locked state is detected.

In the induction motor, the rotational speed of the rotating magnetic field and the rotational speed of the rotor has the following relationship: (rotational speed of rotating magnetic field)=(rotational speed of rotor)+(slip). Since the rotational speed of the rotating magnetic field is obtained by dividing the frequency of phase current (which will be referred to as "electric frequency") by (pole number/2), the electric frequency and the rotational speed of the rotor has the following relationship: (electric frequency (Hz))=(rotational speed (rps) of rotor)×(pole number/2)+(slip)×(pole number/2). In the following, the first term on the right side of this equation will be denoted as "mechanical frequency", and the second term will be denoted as "slip frequency". In this case, the above equation is rewritten into the following equation: (electric frequency)=(mechanical frequency)+(slip frequency).

The control device for the vehicular power system including the induction motor according to the above aspect of the invention attempts to release the motor from the locked state by utilizing the above-mentioned slip of the induction motor. In the induction motor, the electric frequency can be changed by changing the slip frequency, when the mechanical frequency is equal to a fixed value. Namely, the motor can be released from the locked state by changing the electric frequency.

In the control device according to the above aspect of the invention, the lock-release slip frequency may be a slip frequency that makes the electric frequency substantially equal to a boundary value of the lock range.

In the control device according to the above aspect of the invention, the electronic control unit may be configured to calculate a torque value corresponding to the lock-release slip frequency, based on a pre-stored relationship between the slip frequency and torque of the induction motor. The electronic control unit may also be configured to control the induction motor based on the obtained torque value.

According to a second aspect of the invention, a control method for vehicle having an electronic control unit and a vehicular power system that includes an induction motor, the method includes the steps of: (a) detecting, by the electronic control unit, a locked state of the induction motor, (b) calculating, by the electronic control unit, a lock-release slip frequency that causes an electric frequency to be outside a lock range, and (c) controlling, by the electronic control unit, the induction motor so that a slip frequency of the induction motor becomes equal to the lock-release slip frequency when the locked state is detected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a time chart showing the manner of starting the vehicle on an uphill road.

DETAILED DESCRIPTION OF EMBODIMENTS

One embodiment of the invention will be described with reference to the drawings. In this embodiment, a power system of a four-wheel-drive hybrid vehicle including an induction motor for driving rear wheels will be described as an example of the vehicular power system including the induction motor.

Figure 1:
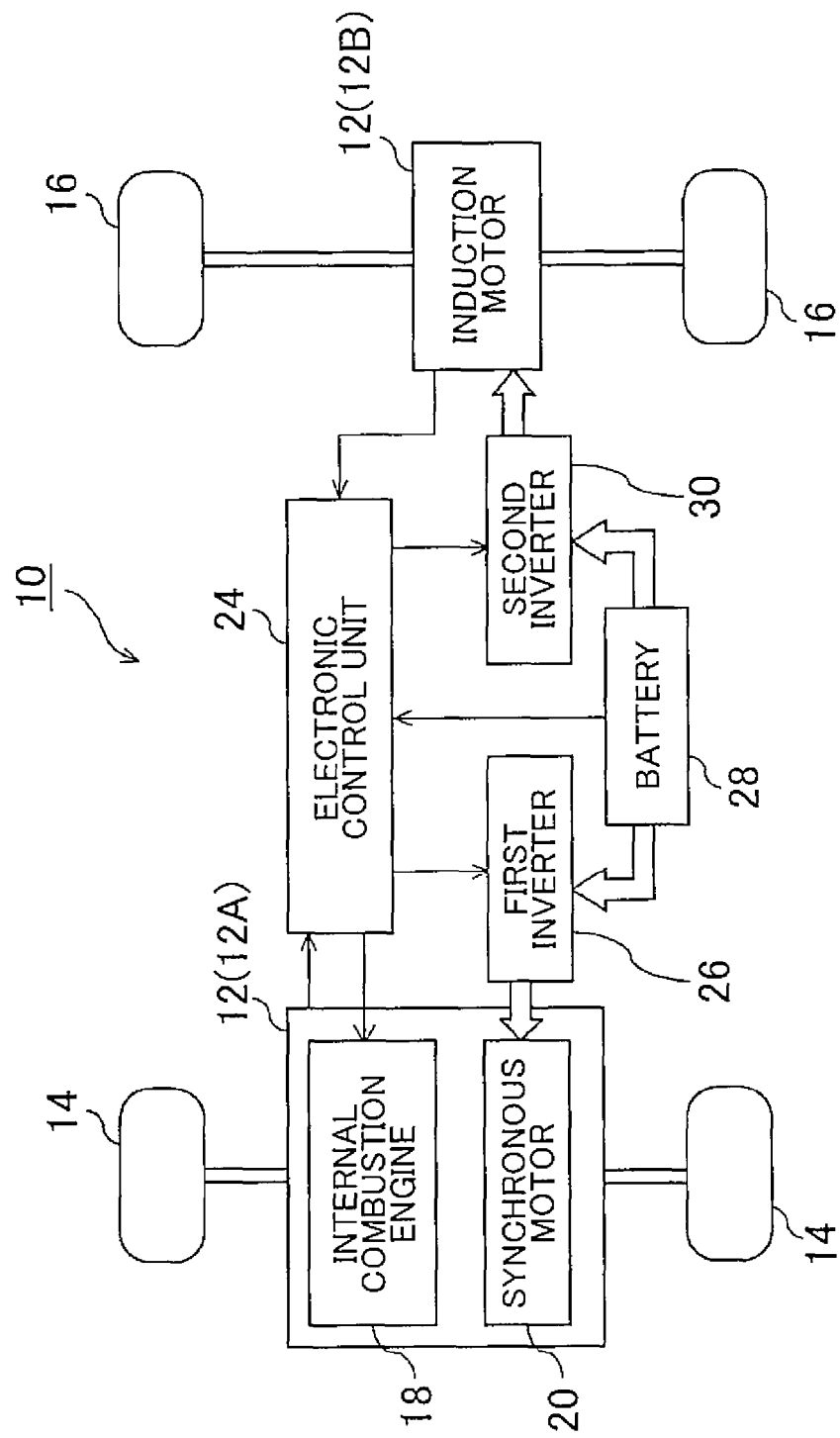
FIG. 1 is a block diagram schematically showing the configuration of a hybrid vehicle.

FIG. 1 schematically illustrates the configuration of a hybrid vehicle 10. A power system 12 of the hybrid vehicle 10 has a front power system 12A that drives front wheels 14, and a rear power system 12B that drives rear wheels 16. The front power system 12A is a combination of an internal combustion engine 18 and a synchronous motor 20. The front power system 12A may include two synchronous motors 20. Depending on the situation, each of the engine 18 and the synchronous motor 20 can drive the vehicle by itself, or both of the engine 18 and the synchronous motor 20 can cooperate to drive the vehicle. The synchronous motor 20 can function as a generator when driven by the engine 18 or due to the inertia of the vehicle. The rear power system 12B includes one induction motor 22, and drives the right and left rear wheels 16 by means of the induction motor 22. A rotor of the induction motor 22 and the rear wheels 16 are connected so as to be rotated with a given relationship. The rear power system 12B may include two induction motors that individually drive the right and left rear wheels 16, respectively. Also, the front power system 12A and the rear power system 12B may be switched around or replaced with each other, namely, the rear wheels may be driven by the engine and the synchronous motor, while the front wheels may be driven by the induction motor.

The hybrid vehicle 10 further includes an electronic control unit 24 that controls the power system 12. The electronic control unit 24 obtains a driver's request from the operation amount of an operating member, such as an accelerator pedal or a brake pedal, and obtains running conditions of the vehicle, such as the speed of the vehicle 10, and the rotational speeds of the engine 18 and motors 20, 22, so as to control the power system 12 based on these pieces of information. The electronic control unit 24 controls the engine 18, by controlling the opening of the throttle valve, fuel injection quantity, injection timing, ignition timing, and so forth. Also, the electronic control unit 24 controls the synchronous motor 20 by controlling a first inverter 26. The first inverter 26 converts DC power from a battery 28, into three-phase AC power of which a current value and a frequency are controlled according to a command from the electronic control unit 24, and supplies the AC power to the synchronous motor 20. Further, the electronic control unit 24 controls the induction motor 22 by controlling a second inverter 30. The second inverter 30 converts DC power from the battery 28, into three-phase AC power of which a current value and a frequency are controlled according to a command from the electronic control unit 24.

To start the hybrid vehicle 10 on a slope, the driver releases the brake pedal and depresses the accelerator pedal. While the driver is changing the pedals, the driving force may be reduced, and the vehicle may move downward on the slope. Since there is a slip in the induction motor 22, the motor 22 may be brought into a locked state in which the electric frequency becomes equal to 0, when the vehicle moves at a considerably low speed. While the mechanical frequency and the electric frequency are in a fixed relationship in the synchronous motor, there is a slip in the induction motor, and the electric frequency may be changed to some extent, relative to the mechanical frequency. In this embodiment, this characteristic of the induction motor is utilized so as to release the induction motor from the locked state.

Figure 2:
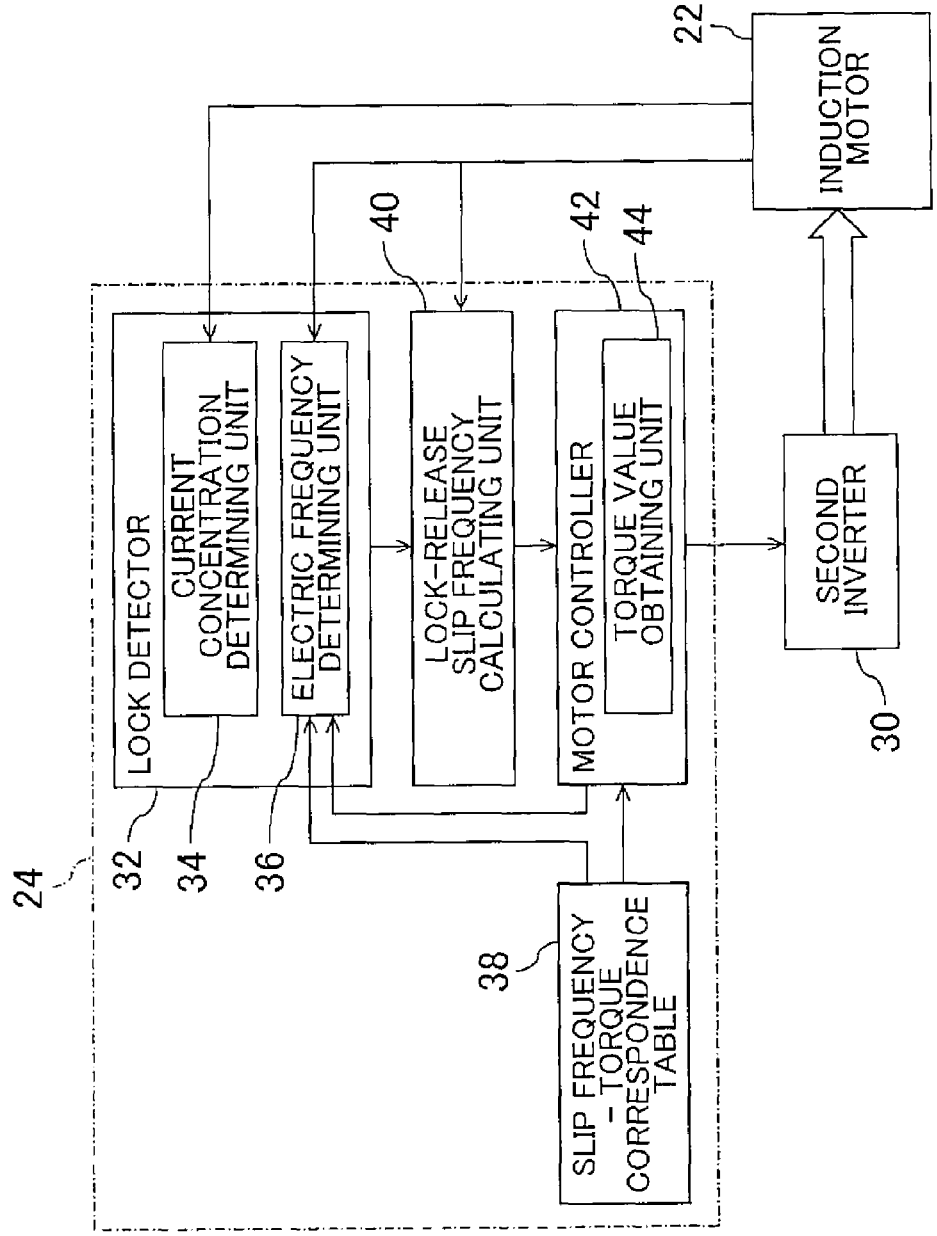
FIG. 2 is a block diagram showing a principal part of an electronic control unit.

FIG. 2 is a block diagram showing the configuration of a principal part of the electronic control unit 24, namely, the arrangement for releasing the lock of the induction motor 22. Each block represents a control function of the electronic control unit 24. A lock detector 32 detects or determines that the induction motor 22 is in a locked state. It is determined that the induction motor 22 is in the locked state, when a first condition that a current of a given value or larger has been flowing into one phase for a given period of time or longer (current concentrated state), and a second condition that the electric frequency is within a given range around 0, are both satisfied.

A current concentration determining unit 34 monitors each phase current of the induction motor 22, and determines that the motor 22 is in the current concentrated state if the phase current that has reached a given value or larger continues to be equal to or larger than the given value for a given period of time or longer. The given period of time is a permissible period of time for which the current is permitted to keep flowing into one phase. If the time for which the current keeps flowing into one phase is within the permissible time, a circuit of this phase will not be overheated to a greater extent than expected, due to the current concentration. The permissible time may be changed according to the current flowing at that time. If the current is small, the heat generated is reduced; therefore, it takes a longer time for the circuit to be overheated, and the permissible time can be extended to be longer.

An electric frequency determining unit 36 calculates the electric frequency, from the mechanical frequency of the induction motor 22, and the slip frequency corresponding to a torque command value at this point in time, and determines that the induction motor 22 is in the locked state when the electric frequency is within a lock range as a given range around 0. The mechanical frequency of the induction motor 22 can be obtained by a resolver that detects rotation of the rotor of the induction motor 22. The torque command value is calculated by the electronic control unit 24. In the induction motor, there is a fixed relationship between the torque and the slip frequency, and the relationship is stored as correspondence table data 38 in the electronic control unit 24. Referring to the correspondence table data 38, the slip frequency at that point in time is calculated, based on the torque command value. Then, the electric frequency is calculated by summing the mechanical frequency and the slip frequency.

While the lock detector 32 detects the locked state based on the current concentration and the electric frequency, it may detect the locked state based on one of the current concentration and the electric frequency.

If the locked state of the induction motor 22 is detected, a lock-release slip frequency calculating unit 40 calculates the slip frequency (lock-release slip frequency) for releasing the induction motor 22 from the locked state. The lock-release slip frequency is a slip frequency that causes the electric frequency to be outside a given range around 0. The given range may be the above-indicated lock range in which the lock is detected. A motor controller 42 controls the induction motor 22 so that the slip frequency becomes equal to the lock-release slip frequency. For example, a torque obtaining unit 44 included in the motor controller 42 obtains a torque value corresponding to the lock-release slip frequency, referring to the table data 38 indicative of the correspondence between the slip frequency and the torque, and controls the induction motor 22, using the torque value as a command value.

Figure 3:
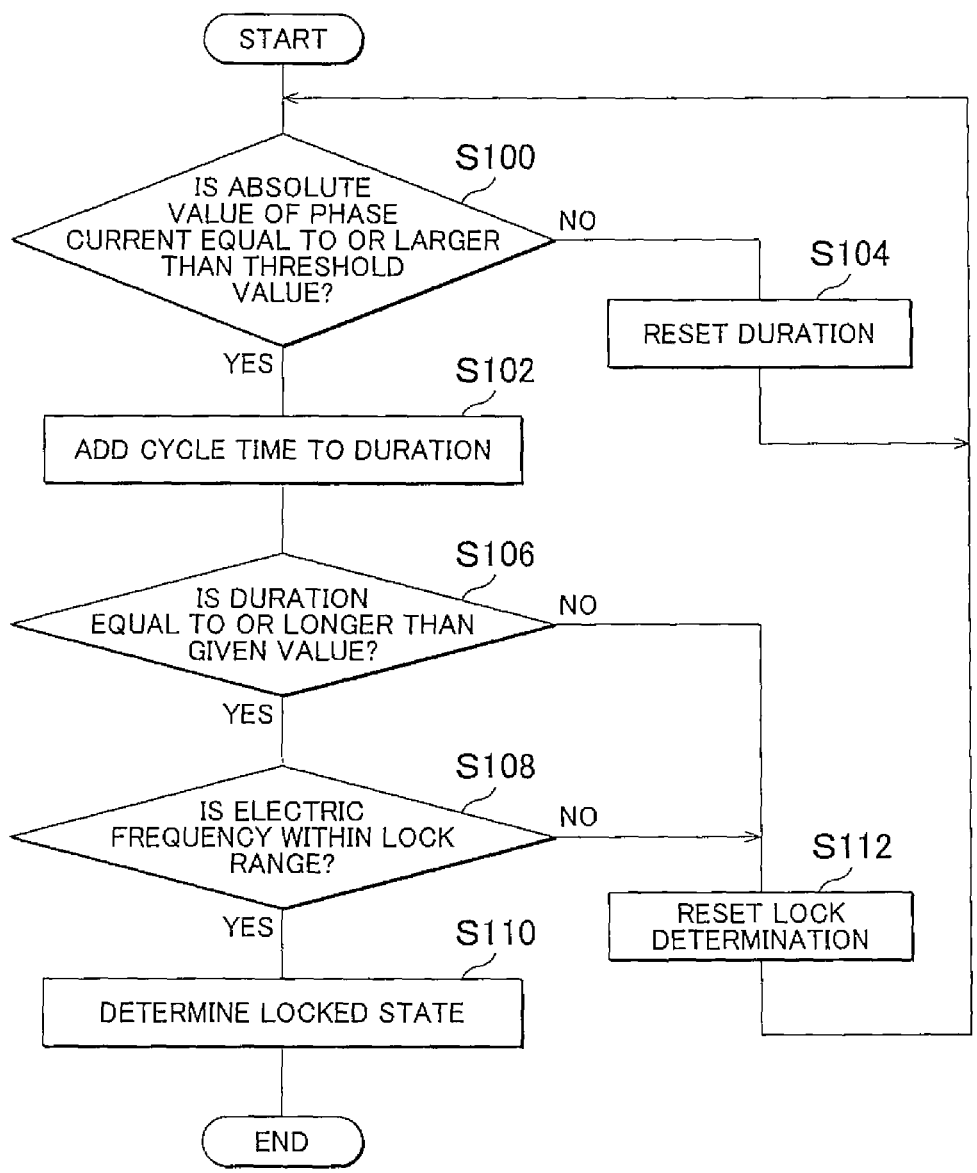
FIG. 3 is a flowchart illustrating a routine for determining a locked state of a motor.

FIG. 3 is a flowchart illustrating a routine concerned with determination of the locked state. It is checked whether an absolute value of each phase current of the three phases is equal to or larger than a predetermined threshold value (S100). The threshold value may be determined such that a problem, such as overheating of the circuit, will not occur even if the phase current equal to the threshold value keeps flowing into one phase. If the absolute value of the phase current is equal to or larger than the threshold value, the duration of this state, or the length of time for which this state lasts, starts being measured. More specifically, the duration is calculated by adding the cycle time of this routine to the duration up to this point (S102). If it is determined in step S100 that the phase current is smaller than the threshold value, the control goes to step S104, to reset the duration up to this point. After resetting, the control returns to step S100.

Then, it is determined whether the duration is equal to or longer than a permissible period of time (S106). The permissible time may be set to a period of time for which a problem, such as overheating of the circuit, does not occur even if the maximum current keeps flowing. If the duration is equal to or longer than the permissible time, it is determined whether the electric frequency is within the lock range (S108). The electric frequency Ne may be calculated as the sum of the current mechanical frequency Nm of the induction motor 22, and the slip frequency Ns corresponding to the torque command value (Ne=Nm+Ns). When the rotational speed of the induction motor is obtained as the number of rotations per minute, it is converted in unit into frequency (Hz), to be expressed as the mechanical frequency. The current slip frequency is calculated based the current toque command value, referring to the correspondence table data 38 indicating the relationship between the slip frequency and the torque. If the electric frequency is within the lock range, it is determined that the induction motor 22 is in the locked state (S110). If a negative decision (NO) is obtained in either of step S106 and step S108, the lock determination is reset (S112), and the control returns to step S100.

Figure 4:
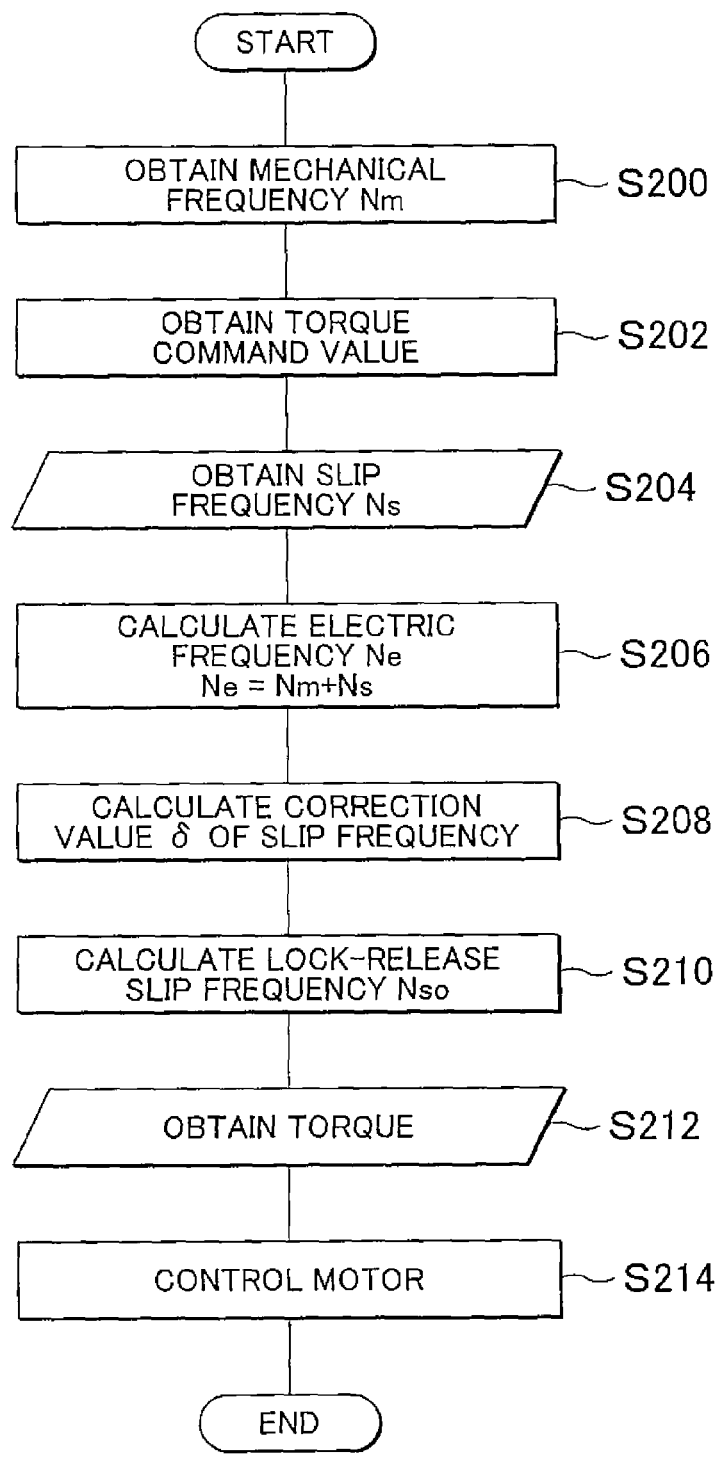
FIG. 4 is a flowchart illustrating control performed when the motor is in the locked state.

FIG. 4 is a flowchart illustrating a routine concerned with control of the induction motor 22 when it is brought into the locked state. Initially, the current mechanical frequency Nm of the induction motor 22 is obtained (S200). The mechanical frequency Nm may be obtained by means of a resolver that detects rotation of the rotor of the induction motor 22. Then, the current torque command value is obtained (S202). The electronic control unit 24 constantly calculates the torque command value so as to control the induction motor 22, and the torque command value thus calculated is used. The current slip frequency Ns is obtained based on the torque command value (S204). There is a fixed relationship between the torque of the induction motor and the slip frequency, and this relationship is stored as the slip-frequency—torque correspondence table data 38. Referring to the correspondence table data 38, the slip frequency can be obtained from the current torque command value. The current electric frequency Ne is calculated by summing the mechanical frequency Nm obtained in step S200, and the slip frequency Ns obtained in step S204 (S206).

Then, the slip frequency Nso for releasing the induction motor 22 from the locked state is calculated. Initially, a correction value δ that changes the current electric frequency Ne to an electric frequency outside the lock range is obtained (S208). The correction value δ can be calculated as a difference between the electric frequency outside the lock range, and the current electric frequency Ne. The electric frequency outside the lock range may be a boundary value, i.e., an upper limit or a lower limit, of the lock range, for example. The lock-release slip frequency Nso is calculated by adding the correction value δ to the slip frequency Ns obtained in step S204 (Nso=Ns+δ) (S210). Referring to the slip-frequency—torque correspondence table data 38, a torque value corresponding to the lock-release slip frequency Nso is obtained (S212). The motor is controlled, using the torque value as a torque command value (S214). In this manner, the electric frequency falls outside the lock range, and the motor is released from the locked state. As a result, in the routine shown in FIG. 3, a negative decision (NO) is obtained in step S108, and the lock determination is reset in step S112.

FIG. 5 is a time chart indicating the manner in which the hybrid vehicle 10 is started, on an uphill road, to ascend the uphill road, from a condition where the vehicle 10 is moving backward and descending the uphill road. Initially, the vehicle speed is a negative value since the vehicle 10 is descending the uphill road. At time t1, the vehicle 10 starts being accelerated due to the driving force of the front power system 12A. Then, at time t2, the vehicle 10 starts being driven by the induction motor 22 as the rear power system 12B. At time t3, the phase current reaches the threshold value based on which current concentration is determined. In FIG. 5, torque Ts in the torque graph is a torque value corresponding to the phase current of the threshold value. The duration for which electric current keeps flowing into one phase is measured from time t3. Time t4 indicates a point in time at which the duration reaches a given period of time. If current keeps flowing into one phase for the given period of time or longer, a current concentration flag is set. If the current concentration flag is set, it is determined whether the electric frequency at this point is within the lock range. If it is in the lock range, a lock flag is set. If both of these two flags are set, the locked state is determined. If the locked state is determined, the slip frequency (lock-release slip frequency) that causes the electric frequency to be outside the locked range is calculated, and the torque value To corresponding to the calculated slip frequency is obtained. The torque command value is changed so as to be equal to the torque value thus obtained. If the torque reaches the torque value To (time t5), the electric frequency falls outside the lock range, and the current concentration flag and the lock flag are reset. Since the locked state is eliminated, the torque can be increased to the required torque.

While the front power system 12A of the above-described embodiment is a hybrid power system that is a combination of the internal combustion engine and the synchronous motor, it may be a power system that is a combination of an internal combustion engine and an induction motor, or may be a power system of an internal combustion engine alone, or that of an electric motor alone.

What is claimed is:

1. A control device for a vehicular power system including an induction motor, the control device comprising:
an electronic control unit configured to:
(a) detect a locked state of the induction motor;
(b) calculate a lock-release slip frequency that causes an electric frequency to be outside a lock range; and
(c) control the induction motor so that a slip frequency of the induction motor becomes equal to the lock-release slip frequency when the locked state is detected.

2. The control device according to claim 1, wherein the lock-release slip frequency is a slip frequency that makes the electric frequency substantially equal to a boundary value of the lock range.

3. The control device according to claim 1, wherein the electronic control unit is configured to calculate a torque value corresponding to the lock-release slip frequency, based on a pre-stored relationship between the slip frequency and torque of the induction motor, the electronic control unit being configured to control the induction motor based on the obtained torque value.

4. A control method for vehicle having an electronic control unit and a vehicular power system that includes an induction motor, the method comprising:
(a) detecting, by the electronic control unit, a locked state of the induction motor;
(b) calculating, by the electronic control unit, a lock-release slip frequency that causes an electric frequency to be outside a lock range; and
(c) controlling, by the electronic control unit, the induction motor so that a slip frequency of the induction motor becomes equal to the lock-release slip frequency when the locked state is detected.

* * * * *